United States Patent [19]

Hegedus

[11] Patent Number: 4,958,874
[45] Date of Patent: Sep. 25, 1990

[54] MOBILE EXHIBITION UNIT

[76] Inventor: Leslie J. Hegedus, 24 Culross St., London, England, W1Y 3HE

[21] Appl. No.: 272,624

[22] Filed: Nov. 17, 1988

[30] Foreign Application Priority Data

Nov. 20, 1987 [GB] United Kingdom ............. 8727251
Mar. 15, 1988 [GB] United Kingdom ............. 8806078

[51] Int. Cl.$^5$ .......................................... B60P 3/025
[52] U.S. Cl. ..................................... 296/26; 296/175; 296/21; 52/66; 52/67; 52/79.5
[58] Field of Search ................ 296/25, 26, 27, 172, 296/175, 176, 21; 52/79.5, 66, 67, 68, 69, 71, 64

[56] References Cited

U.S. PATENT DOCUMENTS

| | | | |
|---|---|---|---|
| 2,765,499 | 10/1956 | Couse | 296/176 X |
| 3,534,997 | 10/1970 | Mitchell | 296/176 |
| 3,620,564 | 11/1971 | Wenger et al. | 296/83 |
| 3,632,153 | 1/1972 | Knudsen | 296/169 |
| 3,743,346 | 7/1973 | Senn et al. | 296/164 |
| 4,019,773 | 4/1977 | Vehling | 296/21 |
| 4,135,755 | 1/1979 | Steffens | 296/26 |
| 4,462,631 | 7/1984 | Lange | 296/26 X |

FOREIGN PATENT DOCUMENTS

| | | | |
|---|---|---|---|
| 5409873 | 10/1974 | Australia | 296/26 |
| 179635 | 4/1986 | European Pat. Off. . | |
| 1232838 | 1/1967 | Fed. Rep. of Germany | 296/26 |
| 902131 | 4/1945 | France . | |
| 2328590 | 5/1977 | France | 296/26 |
| 989 | 4/1981 | PCT Int'l Appl. . | |
| 81/00989 | 4/1981 | PCT Int'l Appl. | 296/27 |
| 84/00331 | 2/1984 | PCT Int'l Appl. | 296/176 |
| 1105363 | 3/1968 | United Kingdom . | |
| 1307435 | 2/1973 | United Kingdom . | |
| 2069419 | 8/1981 | United Kingdom . | |
| 2033940 | 3/1983 | United Kingdom . | |

Primary Examiner—Margaret A. Focarino
Assistant Examiner—Andrew C. Pike
Attorney, Agent, or Firm—Joseph S. Iandiorio; Brian M. Dingman

[57] ABSTRACT

A mobile unit comprises a lorry trailer having side wall portions which pivot down to form an enlarged floor and upwardly-slidable panels or frames from which unfold side-roof portions, e.g. canopies or pivotable panels.

7 Claims, 4 Drawing Sheets

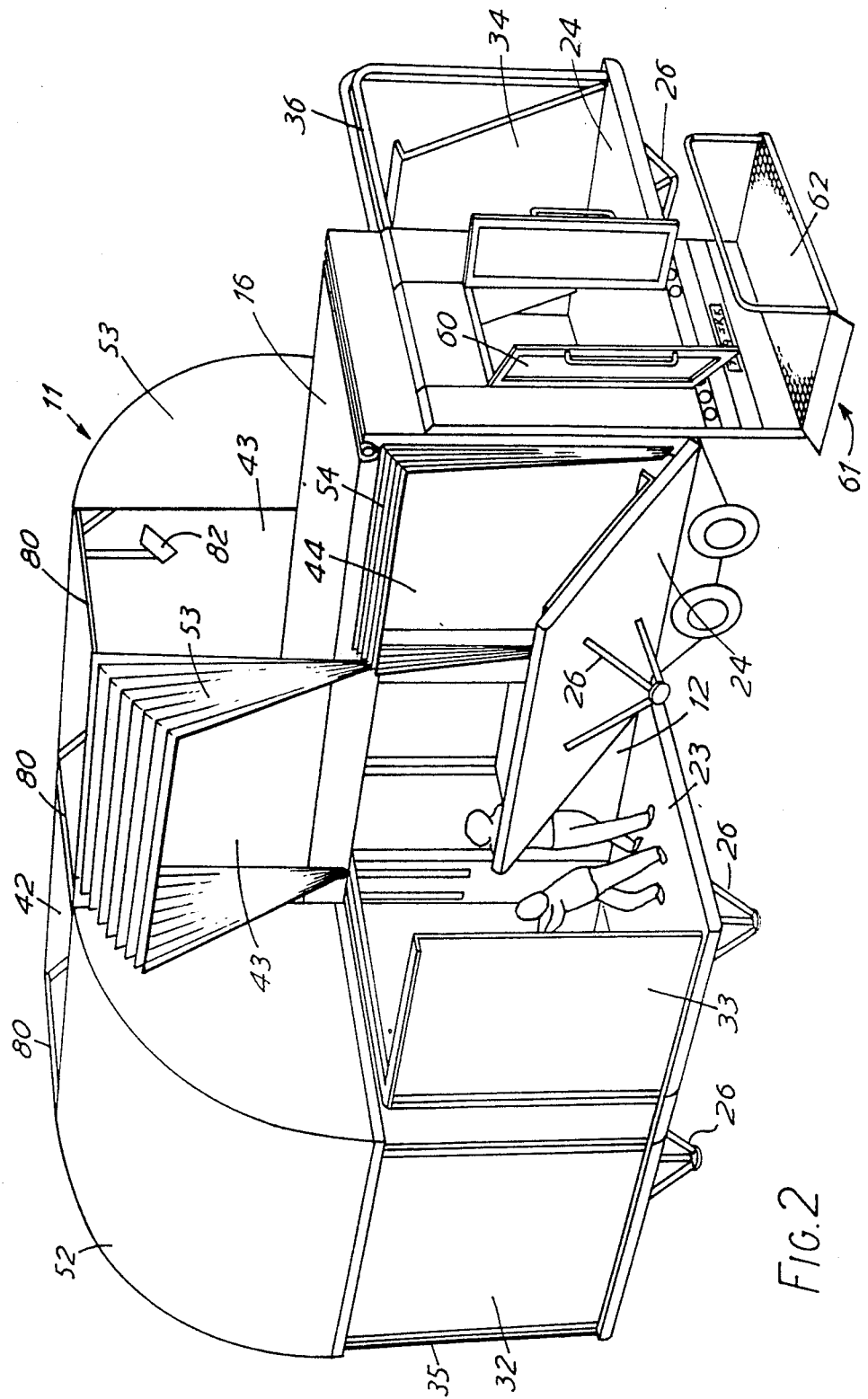

MOBILE EXHIBITION UNIT

BACKGROUND OF THE INVENTION

The present invention relates to a mobile exhibition unit and more particularly to a unit which is entirely stored within a lorry trailer during transport from one exhibition site to another.

In PCT application WO No. 81/00989 there is disclosed a mobile unit comprising a lorry trailer having an elongate floor, an elongate roof and two generally parallel and elongate side-walls comprising panels which are pivotable relative to the trailer base so as to provide an expanded unit with a larger area than the elongate floor, the trailer also having side-roof portions which unfold therefrom to cover the areas of the expanded unit at each side of the elongate roof. However, the side-roof portions occupy a substantial part of the space when folded up inside the trailer. In addition, the height of the roof of the expanded unit is limited to the height plus half the width of the original trailer.

SUMMARY OF THE INVENTION

The present invention seeks to overcome or reduce at least one of the above disadvantages.

According to the present invention there is provided a mobile unit comprising a lorry trailer having an elongate floor, an elongate roof, and two generally parallel and elongate side-walls, said side- walls comprising panels, said panels being pivotable relative to said elongate floor to provide an expanded unit with floor areas additional to said elongate floor and at each side thereof, said trailer also having side-roof portions, said portions unfolding from said trailer to cover said additional areas, wherein said side-roof portions are mounted on upwardly slidable structural members.

BRIEF DESCRIPTION OF THE DRAWINGS

A preferred embodiment of the present invention will now be described, by way of example only, with reference to the accompanying drawings, of which:

FIG. 2 shows a partly folded-out exhibition unit in accordance with a first embodiment of the present invention;

DESCRIPTION OF THE PREFERRED EMBODIMENTS

Basically the present invention provides a mobile unit comprising a lorry trailer having an elongate floor, an elongate roof and two generally parallel and elongate side-walls comprising panels which are pivotable relative to the trailer base so as to provide an expanded unit with a larger area than the elongate floor, the trailer also having side-roof portions which unfold therefrom to cover the areas of the expanded unit at each side of the elongate roof, characterised in that the side-roof portions are mounted on upwardly slidable structural members. This permits the provision of an expanded unit with much greater height, e.g. up to 1.7 times or even substantially twice the height of the original trailer.

In one preferred unit the slidable structural members are telescopic. This permits units of even greater heights to be provided, although they are less stable.

In the trailer configuration, the slidable structural members and the side-roof portions are arranged substantially parallel to the respective side-walls. This provides a very compact arrangement and permits virtually all of the trailer storage space to be exploited for other purposes during transport.

In a preferred arrangement the elongate roof of the trailer remains fixed, even in the expanded unit configuration; this provides greater stability during transport and greater security against vandalism and theft.

In a preferred arrangement each side-wall comprises a plurality of panels which are each pivotable relative to the trailer floor to a substantially horizontal position in which they constitute side-floor portions of the floor of the exhibition unit. Preferably panels of a second type are pivotably attached to the ends of the first panels remote from the trailer floor, said second type panels being pivotable to a substantially vertical position in which they constitute the side-walls of the exhibition unit.

To form the side-roof portions panels of a third type may be vertically slidably mounted relative to the trailer roof, each having a folded-up canopy attached thereto, whereby, after sliding said third type panels upwards by a distance equal to or just less than the height of the trailer side-walls, the canopies are folded out so that their ends remote from the roof are arranged to meet the top edges of the second type panels.

Alternatively the third type panels may have fourth type panels pivoted to the top thereof which may pivot outwardly to meet the top edges of the second type panels.

Preferably the lorry trailer has front and rear walls at least one of which comprises a door to constitute an entrance to and/or exit from the exhibition unit.

Figure 1:
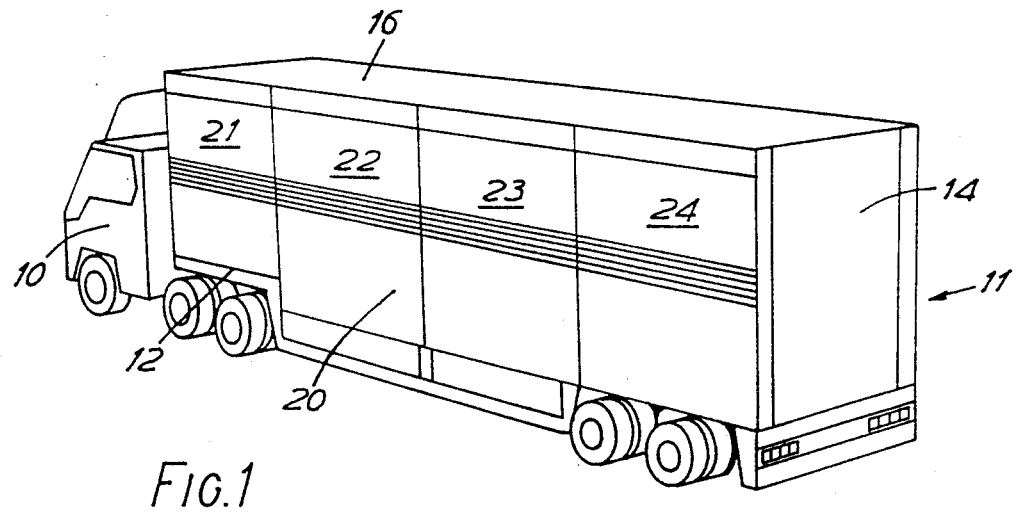
FIG. 1 shows a lorry with a trailer having an exhibition unit in accordance with the present invention.

Referring now to the drawings, FIG. 1 shows a lorry tractor unit 10 pulling a low level HGV trailer 11 comprising a floor or base 12, a rear wall 14, a front wall (not shown), roof 16 having opposed elongate edges and a side-wall 20 comprising panels 21,22,23 and 24.

The conversion of the trailer 11 into its exhibition unit configuration will now be described with reference to FIGS. 2 to 6. Firstly feet 26 are formed on the exterior of the side-wall panels 22,23,24. The feet may be completely separate members originally housed within the interior of the trailer and subsequently attached to the side-walls, e.g. by screws. Alternatively, the feet may comprise a plurality of individual struts which originally lie flat against the respective panel but are subsequently interconnected to provide firm support feet 26. Side-wall panels 22,23 and 24, which are pivotally attached to the elongate edges of the lorry trailer floor 12, are then lowered so as to lie substantially coplanar with floor 12 to form the expanded floor of the exhibition unit. The height of each foot 26 is adjustable to allow the unit floor to be level even when positioned on unlevel ground. As shown, the various erection steps are performed manually.

Further panels 32,33,34, which are pivotally attached to the outer edges of panels 22,23,24, are then raised to a vertical position in which they constitute side-walls of the exhibition unit. Any convenient means may be provided for maintaining panels 32,33,34 in their vertical position, e.g. a framework 36, only part of which is shown in FIG. 2.

Figure 3:
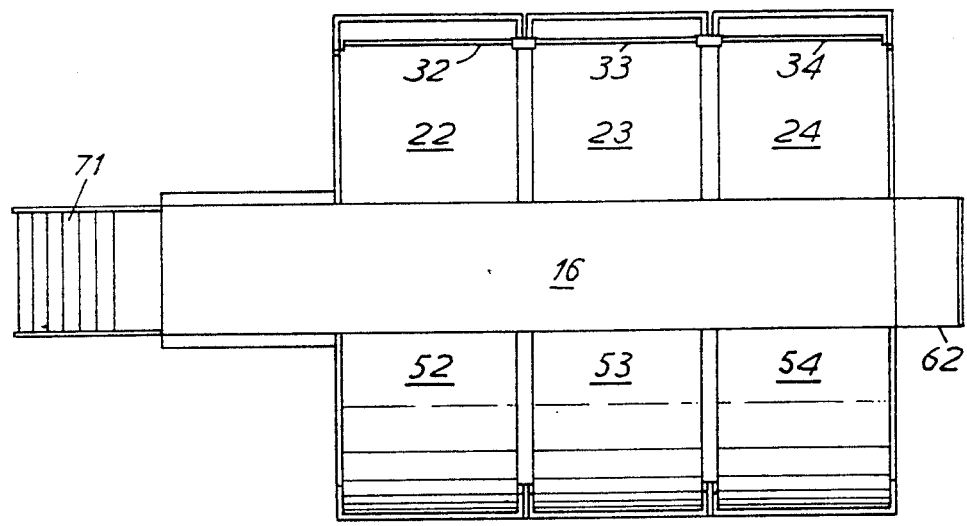
FIGS. 3, 4, 5 and 6 show respective top, side, front and rear views of the completely-erected exhibition unit of FIG. 2.
Figure 4:
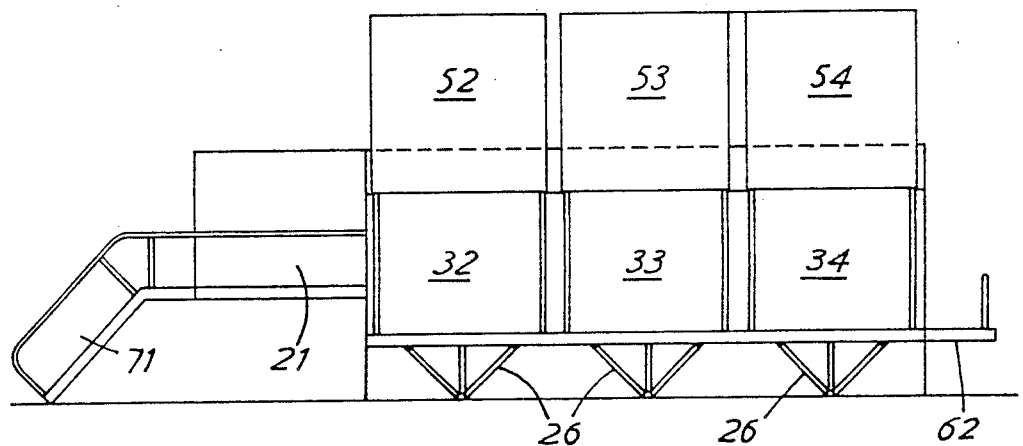
Figure 5:
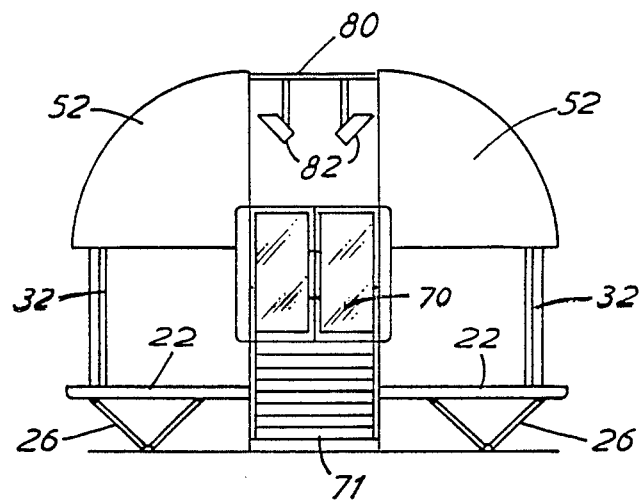
Figure 6:
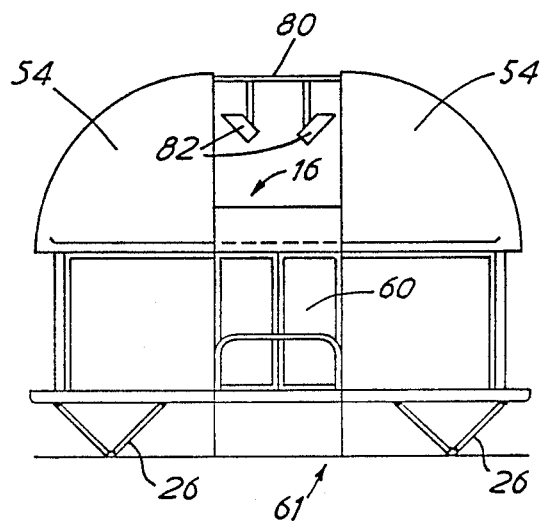

Further panels such as panels 42,43,44, which are vertically slidably attached to the elongate edges of roof 16, are then slid up by a distance substantially equal to the height of panels 32–34. Panels 42,43,44 are then locked, by means not shown, in their raised position and the tops of the corresponding panels on opposite sides of the unit are connected together by horizontal bracing struts, beams or girders 80. Diagonal struts may additionally or alternatively be employed. Quadrant-shaped and concertina-type canopies 52,53,54 are unfolded outwardly from the panels to meet the top edges of panels 32,33,34 respectively. FIG. 3 shows the canopies erected at only one side of the units.

The whole assembly is then tensioned by cables such as cable 35 so that the articulated components are firmly locked together and the canopy roof is taut.

The exhibition unit thus formed has an exhibition area comprising a central, relatively low-ceilinged part, extending for the entire length of the unit, with the rear three-quarters of the unit being of essentially three times the original width, with the side regions having a raised roof. Canopies 52,53,54 are of light-transmitting, e.g. translucent, material to enable a bright, spacious and attractive exhibition area to be provided.

Panels 42,43,44 are also of light-transmitting, e.g. translucent, material. Lighting, such as spotlights 82, may be suspended from the bracing struts 80 to illuminate the interior of the units directly or by reflection off the inside of canopies 52,53,54. Such lighting needs to be weatherproof as it is located above roof 16, but it has the advantage of having no venting problems and there is no build-up of heat within the unit. In addition the light and its associated electrical wiring are concealed from people inside the unit.

The rear of the unit, which may be covered by a tarpaulin or removable panel etc during transport, is provided with double access doors 60 and a lift 61 secured to the main chassis of the trailer and having a platform 62 to permit the easy access of disabled persons. The front of the unit is similarly provided with double doors 70 and, after tractor unit 10 has driven away, a flight of stairs 71 is positioned at the front end of the unit leading up to doors 70.

The above-described exhibition unit has a number of advantages. The unit is easily transportable and, once arrived at an exhibition site, can easily be erected by untrained personnel. The individual panels are light and easily moved. The unit is readily dismantled simply by reversing the previously-described procedure. The unit provides its own floor and is thus fully self-contained. There is no need to obtain duck-boards etc from elsewhere. By arranging the doors of the unit to be located in non-collapsible walls of the trailer, it is particularly secure against vandalism and other unauthorised entry. The tractor unit 10 is only required for transport and thus can handle other tasks until transfer to another exhibition site is necessary. Compared to its erected width, the exhibition unit is extremely narrow during transport and thus can be located at otherwise inaccessible sites. The trailer is also comparatively low so that access to exhibition halls with low doorways is no problem. Because feet 26 are adjustable, the unit can be erected on uneven ground. Even the raised portion at the front of the trailer is fully exploited, i.e. as an entrance platform.

A further advantage of the exhibition unit is that, when erected, it bears no resemblance to the trailer from which it is transformed; if desired this effect may be enhanced by providing a skirt around the unit. Also the cost of constructing the unit compares favourably with the cost of mounting a single temporary stand in an exhibition hall, even though the unit is re-usable and mobile. All the contents of the exhibition and any accessories can conveniently and safely be housed in the trailer during transport.

From a trailer 12.2 m long, 2.5 m wide and 3.0 m high, an exhibition unit is provided which has a width of 6.7 m, corresponding to a height of panels 22,23,24 of 2.1 m.

Numerous modifications may be made to the above-described unit if required. In particular panels 42,43,44 may be arranged to slide vertically in means attached to the floor of the trailer instead of or in addition to the edges of the roof. The walls and roof of the unit may be erected by many different combinations of pivoting, sliding and unfolding. Merely as an example, the panels 42,43,44 may be replaced by upwardly slidable frame members and roof 16 may be upwardly movable to provide an exhibition unit which has a raised roof throughout. Such an arrangement is, however, slightly less stable during transit. By providing a further set of panels between panels 22,23,24 and 32,33,34 a yet further extended floor area may be obtained. The various modules do not need internal walls so that there can be one very large area of floor space throughout the unit. During transit, the side-walls 22,23,24 of the unit may be covered by tarpaulins or by removable panels etc.

Struts 80 may be initially attached to the unit or can be inserted later. Similarly lighting 82 may be initially attached to the struts 80 or can be inserted later. Alternatively lighting 82 may be suspended from the tensioning cables.

The entrance and/or exit may be at the side of the unit if desired. One or more of the panels 32,33,34 may be removable so that two exhibition units may be parked side-by-side to form one large combined display area.

The panels may be lowered hydraulically or electrically from a central control which is mounted on board but which can be concealed during the exhibition itself.

Although the unit has been described as an exhibition unit, it can also be used for conferences, domestic or office accommodation, a workshop, a hospitality suite or, with selected panels 32,33,34 made transparent, as a grandstand.

The modular construction can be applied to other vehicles, e.g. to a truck chassis.

Figure 7:
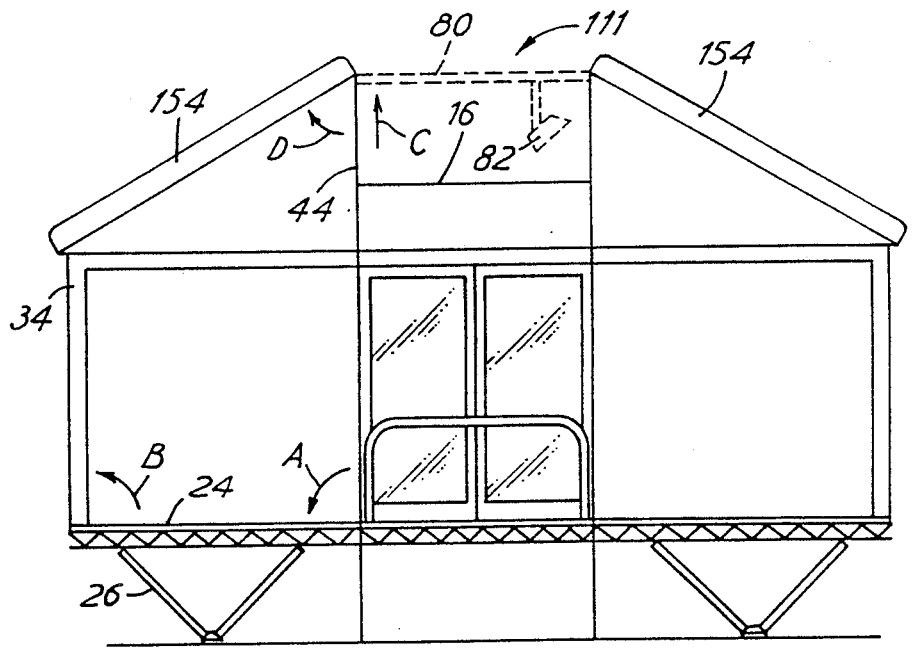
FIG. 7 shows a rear view of a folded-out exhibition unit in accordance with a second embodiment of the present invention.

FIG. 7 shows a unit according to a second embodiment of the present invention, with similar parts having similar reference numerals. When unfolding the unit 111, side-wall panels such as 24 are pivoted down (arrow A) and then further panels 34 are pivoted upward (arrow B). Panels such as 44 are slid upwardly (arrow C) by a height of up to 1.7 times the height of the original trailer 111, and panels such as 154, which are originally parallel to the panels 144 are then pivoted outwardly (arrow D) to meet the top edge of panel 34. The length of panel 154 is substantially equal to or less than the height of the original trailer. To revert to a mobile trailer, the above procedure is simply reversed. The same modifications may be made to the above described embodiment as to that described in connection with FIGS. 2 to 6. In particular the panels 44 or their replacements may be telescopic to permit greater heights for the expanded unit; panels 154 are then also made telescopic, or have further panels connected thereto which fold out to be coplanar there with and to effectively extend panels 154. Panels 24 and 34 may be similarly extensible so that the panels 154 in the extended unit slope at any desired angle. Bracing members 80 may be provided in the forms of struts or wires, and lighting 82 may be suspended therefrom.

I claim:

1. A mobile unit comprising:

an elongate floor;

an elongate roof, said roof being stationary relative to said floor;

two generally parallel and elongate side-walls, each said side-wall comprising at least two panels, said panels being pivotable relative to said elongate floor to provide an expanded unit with floor areas additional to said elongate floor and at each side thereof; and at least one side-roof portion, each said side-roof portion being mounted on an upwardly slidable structural member and unfolding from said trailer to cover at least part of said additional floor areas.

2. The mobile unit of claim 1 in which said structural member is upwardly slidable relative to said roof.

3. The mobile unit of claim 2 in which said roof has opposed elongate edges and each said structural member is slidably mounted on one of said edges.

4. The mobile unit of claim 3 in which said side-roof portion includes a foldable canopy attached to each said structural member.

5. The mobile unit of claim 3 in which said side-roof portion includes a side-roof panel pivotably attached to at least one said structural member.

6. A mobile unit according to claim 1, wherein bracing members are provided between said side-roof portions on opposite sides of the unit.

7. A mobile unit according to claim 6, wherein lighting for the unit is attached to said bracing members.

* * * * *